(12) United States Patent
Payne

(10) Patent No.: US 7,703,408 B2
(45) Date of Patent: Apr. 27, 2010

(54) HIGH SPEED HYDRO-SKI STRUCTURE

(76) Inventor: Trevor William Payne, 80 Chinderah Bay Drive, Chinderah, New South Wales (AU) 2487

( * ) Notice: Subject to any disclaimer, the term of this patent is extended or adjusted under 35 U.S.C. 154(b) by 0 days.

(21) Appl. No.: 11/909,560

(22) PCT Filed: Mar. 22, 2006

(86) PCT No.: PCT/AU2006/000371

§ 371 (c)(1), (2), (4) Date: Sep. 24, 2007

(87) PCT Pub. No.: WO2006/099665

PCT Pub. Date: Sep. 28, 2006

(65) Prior Publication Data

US 2008/0190347 A1 Aug. 14, 2008

(30) Foreign Application Priority Data

Mar. 25, 2005 (AU) ............................... 2005201317

(51) Int. Cl.
*B63B 1/18* (2006.01)
*B63B 1/20* (2006.01)
*B63B 1/24* (2006.01)
*B63B 1/28* (2006.01)

(52) U.S. Cl. ..................................... 114/274; 114/283

(58) Field of Classification Search .................. 114/271, 114/274–283, 67 A, 288–290; 441/68–73; D12/300, 309–314; 280/600–610; 244/101, 244/105–109
See application file for complete search history.

(56) References Cited

U.S. PATENT DOCUMENTS

| 1,307,135 | A | * | 6/1919 | Lake | 114/289 |
| 1,728,609 | A | * | 9/1929 | Holler | 114/288 |
| 1,827,242 | A | * | 10/1931 | Korvin-Kroukovsky | 244/101 |
| 3,208,421 | A | * | 9/1965 | Landes et al. | 114/290 |
| 3,991,698 | A | * | 11/1976 | Simpson | 114/288 |
| 4,802,428 | A | * | 2/1989 | Lang | 114/283 |
| 5,860,380 | A | * | 1/1999 | Burg | 114/67 A |
| 5,911,187 | A | * | 6/1999 | Sohm | 114/61.1 |
| 5,988,097 | A | | 11/1999 | Karney et al. | |

FOREIGN PATENT DOCUMENTS

| AU | 2001100374 | | 10/2001 |
| JP | 02133294 | A * | 5/1990 |
| WO | 98/08732 | | 3/1998 |

* cited by examiner

*Primary Examiner*—Ajay Vasudeva
(74) *Attorney, Agent, or Firm*—Shoemaker and Mattare

(57) ABSTRACT

A ski structure for use with a boat hull to support the hull above the water when the boat is underway, the ski structure comprising an air tight housing in the form of an inverted U-shaped shell and a floor which forms a main ski surface and which extends between opposite sides of the U-shaped shell. The ski structure also includes a pair of assist skies or glides positioned lower than the main ski surface which extend substantially the length of the shell and which are adapted to plane on the surface of the water.

11 Claims, 1 Drawing Sheet

HIGH SPEED HYDRO-SKI STRUCTURE

TECHNICAL FIELD

This invention relates to very high speed ski structures for marine vessels

BACKGROUND ART

Modern day marine vessel designs inherently have the disadvantageous characteristics of slow speed and heavy fuel consumption high construction costs imposed on boat manufacturing by the requirement to design hulls to overcome water resistance as much as possible.

SUMMARY OF THE INVENTION

The present invention aims to overcome the above disadvantages by providing the means whereby a vessel's hull can be supported out of contact with the water when underway by riding on an extremely efficient ski assembly and thus largely avoiding the viscosity of the water, which is 800 times that of air. (This concept shares the intention of the hydrofoil concept, but achieves the result in a completely different and more efficient manner.)

The hydro ski structure is a novel invention in as much as it has to incorporate elements that permit it to perform the normal functions of a boat hull but in an extraordinary manner that has never previously been done in maritime history.

The ski structure described here provides the strength and robustness to support a vessel of considerable tonnage on its structure. It incorporates unique elements to assist the structure and its payload to achieve fuel and speed efficiencies never previously attained.

The ski structures themselves have no moving parts, but may have added to them steerage systems, or rams for raising and lowering the ski structures relative to the vessel's hull, or other lifting elements for special purposes.

DETAILED DESCRIPTION OF THE PREFERRED EMBODIMENT

Figure 1:
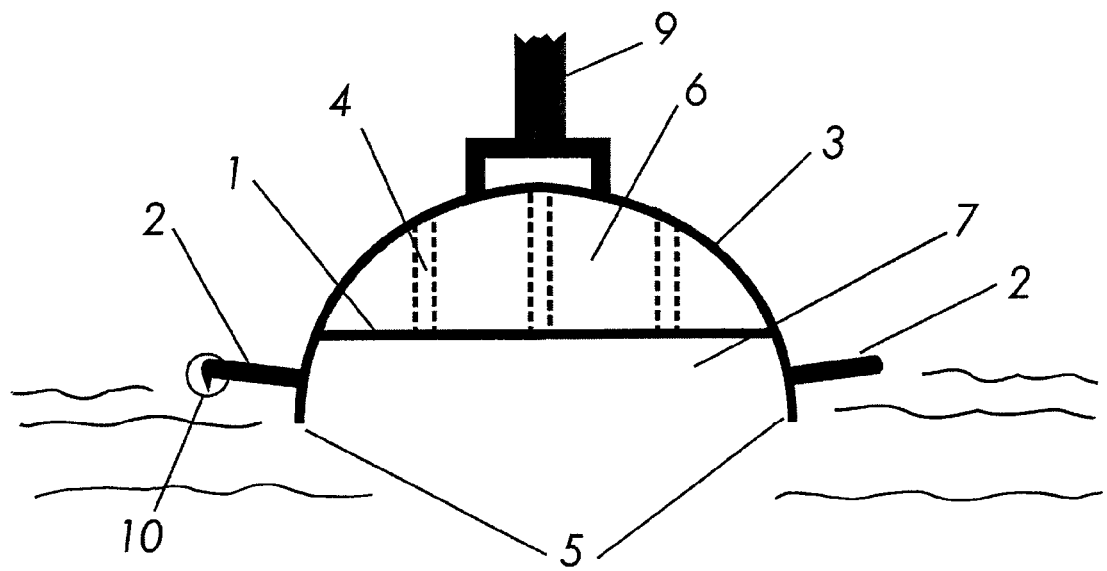
FIG. 1 is a front-on cross section of an embodiment of ski for use with a boat hull according to the invention.
Figure 2:
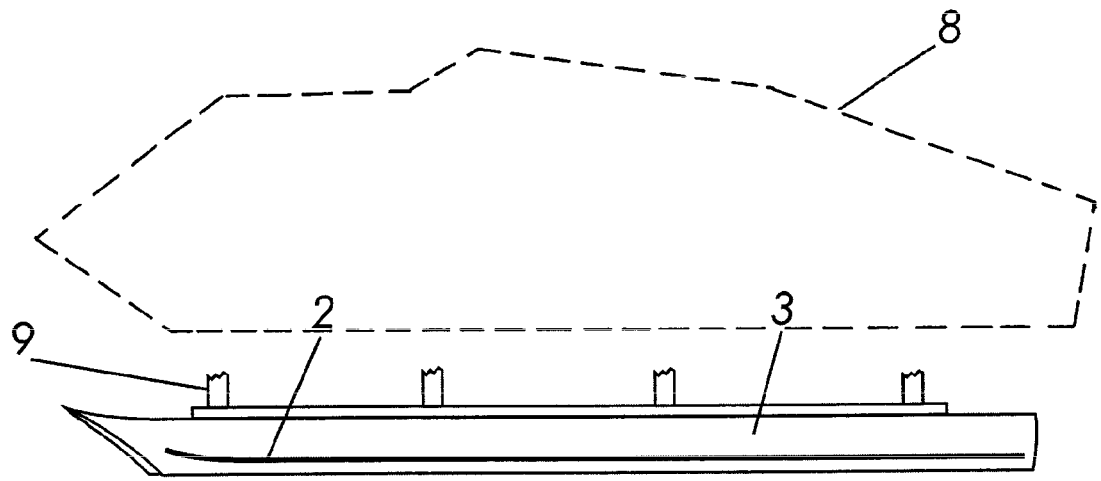
FIG. 2 is a side elevation of a boat hull provided with the skis of FIG. 1.

The ski structure shown in FIG. 1 comprises an airtight housing 6 formed by the inverted "U" shaped shell or top 3 of the ski structure which contains reinforcing 4 and has a floor that bridges the "U" shape shell 3 as seen head-on in cross section to form a main ski surface 1, the ski structure being able to support a boat hull 8 above the water surface while underway. Stanchions 9 extend between the hull 8 and ski structures.

The inverted "U" shaped shell 3 has edges 5 extending down below the main bridging ski surface 1 which run the length of the shell 3 to act like keels and impart directional stability to the ski structure and prevent it from yawing.

Figure 3:
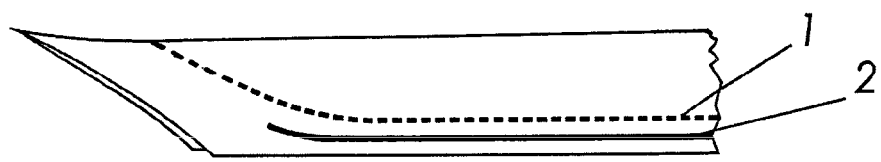
FIG. 3 illustrates the upward curve of the skis at their entry points.

The structure further incorporates a pair of assist skis or "glides" 2 on each side of the outside of the inverted "U" shaped shell 3 extending the length of the shell 3 and affixed at a slightly lower level than the main bridging ski surface 1 which plane on the surface of the water when at speed. The main surface 1 and skis or "glides" have an upward curve at their entry points as shown in FIG. 3.

The downward extending edges 5 provide a means of entrapping air and froth (or other friction relieving agents) between them and the bottom of the main bridging ski surface 1 and the water surface to provide a cushion of air/froth for reducing friction between the skis and water.

The assist skis or glides 2, by being lower than the main ski surface 1, assist the main ski surface 1 to ride higher than the water surface so air or other lubricant may be forced between the two surfaces and the edges 5. This has a complementary and simultaneous action to the surface 1. The assist skis or glides 2 may have downwardly extending lips 10 at their outer ends.

The ski structures are aligned parallel to the vessels hull 8 and in the same direction of travel.

The ski structures serve to permit a vessel to economically travel at much faster speeds than can be achieved by contemporary marine vessel designs. Further the ski structures all serve to permit a vessel vastly improved efficiency in fuel consumption relative to distance travelled when compared to contemporary marine vessel designs. The ski structures further serve to reduce a vessel's fossil fuel emissions (pollution levels) when compared to contemporary marine vessel designs.

The skis' design and roles are multi-fold:

1. To allow marine vessels considerable speed gains over contemporary designs by eliminating or considerably reducing the water resistance on the hull proper and the ski structures themselves.
2. To provide a friction relieving interface of air or other suitable "lubricant" between the skis and the water surface.
3. To effect considerable fuel efficiencies when measured against contemporary hulls.
4. To reduce fossil fuel pollution as a consequence of the speed attained and other fuel efficiency factors.
5. To provide wave-piercing characteristics to the vessel through the ski design.
6. To impart greater stability to a vessel underway by placing the weight bearing points of the hull at the outside edges of the beam.
7. To eliminate the need for special bow and underwater hull designs that add greatly to manufacturing costs.
8. To allow the housing of fuel and propulsion units within the ski structures on sufficiently large vessels.
9. To enable vessels to operate in very shallow waters where hydrofoils and displacements hulls can not venture.
10. To provide environmental advantages such as reducing damage to sea life as a consequence of the shallow operating draught, and a greatly reduced wash when operating in enclosed waters.

The ski design, while having no moving parts, is capable of trapping a cushion of air within the ski surface area to reduce friction between the water surface and underside of the ski. The skis have keel-like edges that run the length of the skis that aid the air entrapment and provide directional stability and prevent yawing.

The ski structure, by being aligned to the direction of travel (unlike hydrofoils whose foils are opposed or diagonal to the direction of travel), affords theoretical speeds of hundreds of knots.

The invention claimed is:

1. A ski structure comprising:
   an air tight housing defined by an inverted U-shaped shell and a floor extending between opposite sides of said U-shaped shell, said floor defining a main ski surface,
   said ski structure being adapted to support a boat hull above the water surface while underway,
   a pair of assist skis or glides on opposite outer sides of said inverted U-shaped shell, said skis or glides extending substantially the length of the shell and being positioned at a slightly lower level than said main ski surface, said skis or glides being adapted to plane on the surface of the water when at speed.

2. A ski structure as claimed in claim 1 wherein said inverted U-shaped shell has opposite side edges extending downwardly below said main ski surface, said edges extending the length of said shell to define keels to impart directional stability to the ski structure.

3. A ski structure as claimed in claim 2 wherein said downward extending edges provide a means of entrapping air and froth or other friction relieving agents between them and the main ski surface and the water surface to provide a cushion of air/froth for reducing friction between the skis and water.

4. A ski structure as claimed in claim 1 wherein said skis or glides have downwardly extending lips at their outer ends.

5. A ski structure as claimed in claim 1 and including reinforcing within said airtight housing between said floor and said U-shaped shell.

6. A marine vessel comprising:
   a boat hull;
   ski structures for supporting said boat hull above a water surface whilst underway, each said ski structure having an air tight housing defined by an inverted U-shaped shell, and a floor extending between opposite sides of said U-shaped shell, said floor defining a main ski surface,
   a pair of assist skis or glides on opposite outer sides of said inverted U-shaped shell, said skis or glides extending substantially the length of the shell and being positioned at a lower level than said main ski surface, said skis or glides being adapted to plane on the surface of the water when at speed.

7. A marine vessel as claimed in claim 6 wherein said inverted U-shaped shell has edges extending downwardly below said main ski surface, said edges extending the length of said shell to define keels to impart directional stability to the ski structure.

8. A marine vessel as claimed in claim 6 wherein said ski structures are aligned parallel to the boat's hull and extend in the same direction of travel as said hull.

9. A marine vessel as claimed in claim 6 and including stanchions between said hull and said ski structures.

10. A ski structure for use with a boat hull, said ski structure comprising:
    an air tight housing defined by an inverted U-shaped shell and a floor extending between opposite sides of said U-shaped shell, said floor defining a main ski surface;
    reinforcing within said housing between said floor and said U-shaped shell; and
    a pair of skis or glides on respective opposite sides of said U-shaped shell, said skis or glides extending substantially the length of the shell and being positioned at a lower level than said main ski surface said skis or glides being adapted to plane on the surface of the water when at speed,
    said ski structure being adapted to support said boat hull above the water surface while underway.

11. A ski structure as claimed in claim 10 wherein said inverted U-shaped shell has opposite side edges extending downwardly below said main ski surface.

* * * * *